(12) United States Patent
Sun

(10) Patent No.: US 11,375,059 B2
(45) Date of Patent: Jun. 28, 2022

(54) DISPLAY METHOD, DISPLAY DEVICE, TERMINAL DEVICE, AND STORAGE MEDIUM

(71) Applicant: SHANGHAI ZTE SOFTWARE CO., LTD., Shanghai (CN)

(72) Inventor: Dongping Sun, Shanghai (CN)

(73) Assignee: SHANGHAI ZTE SOFTWARE CO., LTD., Shanghai (CN)

(*) Notice: Subject to any disclaimer, the term of this patent is extended or adjusted under 35 U.S.C. 154(b) by 170 days.

(21) Appl. No.: 16/638,815

(22) PCT Filed: Sep. 6, 2018

(86) PCT No.: PCT/CN2018/104353
§ 371 (c)(1),
(2) Date: Feb. 13, 2020

(87) PCT Pub. No.: WO2019/047890
PCT Pub. Date: Mar. 14, 2019

(65) Prior Publication Data
US 2020/0404092 A1     Dec. 24, 2020

(30) Foreign Application Priority Data
Sep. 6, 2017   (CN) .......................... 201710797102.4

(51) Int. Cl.
*G09G 5/00*     (2006.01)
*H04M 1/72454*  (2021.01)
(Continued)

(52) U.S. Cl.
CPC ..... *H04M 1/72454* (2021.01); *H04M 1/0266* (2013.01); *H04W 52/027* (2013.01)

(58) Field of Classification Search
CPC ........... H04M 1/72454; H04M 1/0266; H04W 52/027; G09G 5/00; G09G 5/08; G06F 3/02
See application file for complete search history.

(56) References Cited

U.S. PATENT DOCUMENTS

2011/0051160 A1*  3/2011  Shigeeda ........... H04N 1/00244
                                                           358/1.9
2012/0212787 A1   8/2012  Hasegawa
                   (Continued)

FOREIGN PATENT DOCUMENTS

CN    105139792 A    12/2015
CN    106097952 A    11/2016
                   (Continued)

OTHER PUBLICATIONS

China Patent Office, First Office Action (OA1) dated Dec. 7, 2020 for China patent application No. CN201710797102.4.
WIPO, International Search Report dated Nov. 7, 2018.

*Primary Examiner* — Pegeman Karimi
(74) *Attorney, Agent, or Firm* — Vivacqua Crane, PLLC

(57) ABSTRACT

A display method, a display device, a terminal device, and a storage medium are provided. The display method includes: extracting a file attribute of a file to be displayed; automatically setting, according to the file attribute of the file to be displayed, a pixel density of a display screen for displaying the file by searching the pixel density corresponding to the file attribute of the file from a pre-stored pixel density model; and displaying the file according to the pixel density.

11 Claims, 3 Drawing Sheets

(51) Int. Cl.
*H04M 1/02* (2006.01)
*H04W 52/02* (2009.01)

(56) References Cited

U.S. PATENT DOCUMENTS

2012/0250100 A1* 10/2012 Kuraya ................ H04N 1/0417
358/448
2017/0310753 A1* 10/2017 Knothe ............... H04L 67/1097

FOREIGN PATENT DOCUMENTS

| CN | 106527846 A | 3/2017 |
| CN | 106941625 A | 7/2017 |
| WO | WO 2016210206 A1 | 12/2016 |

* cited by examiner

DISPLAY METHOD, DISPLAY DEVICE, TERMINAL DEVICE, AND STORAGE MEDIUM

CROSS REFERENCE TO RELATED ART

The present is a National Phase Application filed under 35 U.S.C. 371 as a national stage of PCT/CN2018/104353, filed on Sep. 6,2018, an application claiming priority from Chinese patent application No. 201710797102.4 entitled "method and device for displaying, mobile terminal" filed on Sep. 6, 2017, the contents of which are incorporated herein by reference in their entirety.

TECHNICAL FIELD

The present disclosure relates to, but not limited to, the field of communication technologies, and in particular, to a display method, a display device, a terminal device, and a storage medium.

BACKGROUND

As user's demands increasing, a display screen of a display device has a higher and higher pixel density. However, the pixel density being higher will result in an increased power consumption of the display screen and the display device. In fact, in some scenarios, it is not necessary to make the pixel density higher.

SUMMARY

An embodiment of the present disclosure provides a display method, including: extracting a file attribute of a file to be displayed; according to the file attribute of the file to be displayed, automatically setting a pixel density of a display screen for displaying the file by searching the pixel density corresponding to the file attribute of the file from a pre-stored pixel density model; and displaying the file according to the set pixel density.

An embodiment of the present disclosure provides a display device, including: an extraction component configured to extract a file attribute of a file to be displayed; a setting component configured to automatically set a pixel density of a display screen for displaying the file, according to the file attribute of the file to be displayed, by searching the pixel density corresponding to the file attribute of the file from a pre-stored pixel density model; and a display component configured to display the file according to the set pixel density.

An embodiment of the present disclosure provides a terminal device, which includes the display device described above.

An embodiment of the present disclosure provides a terminal device, including a memory and a processor, where the memory stores a program capable of being executed on the processor, and the processor executes the program to implement following steps of: extracting a file attribute of a file to be displayed; according to the file attribute of the file to be displayed, automatically setting a pixel density of a display screen for displaying the file by searching the pixel density corresponding to the file attribute of the file from a pre-stored pixel density model; and displaying the file according to the set pixel density.

An embodiment of the present disclosure provides a computer-readable storage medium storing computer-executable instructions which, when executed by a processor, cause the processor to implement the display method described above.

DETAILED DESCRIPTION

In order to make technical solutions and advantages of the present disclosure more apparent, embodiments of the present disclosure will be described in detail below with reference to accompanying drawings. It should be noted that features of the embodiments and implementations of the present disclosure may be arbitrarily combined without conflict.

Figure 1:
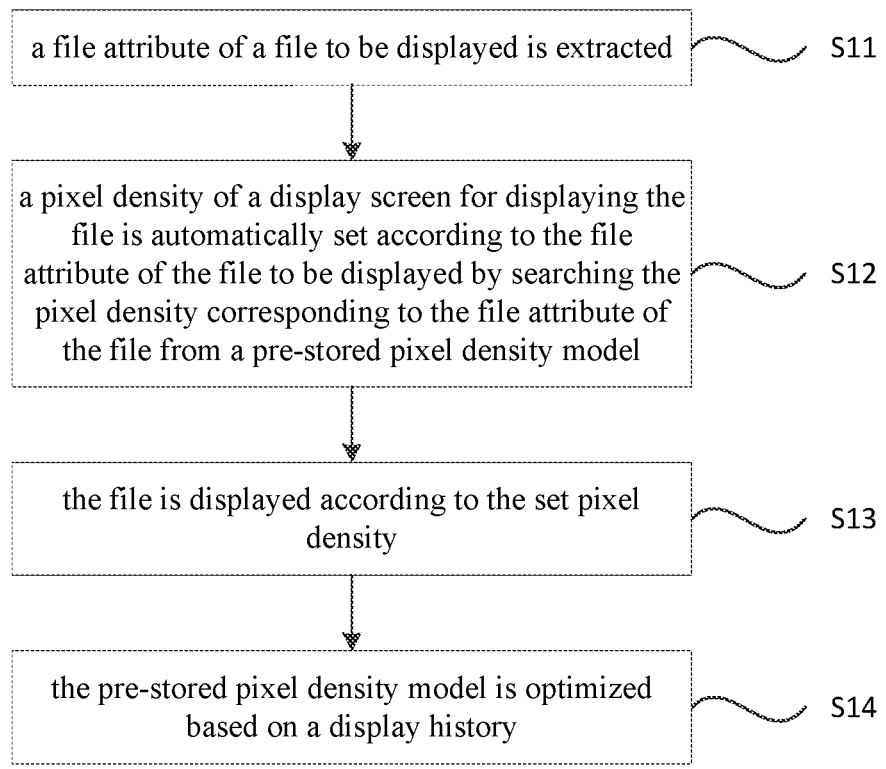
FIG. 1 is a flow chart of a display method of an embodiment of the present disclosure.

FIG. 1 shows a flow chart of a display method of an embodiment of the present disclosure. As shown in FIG. 1, the display method may include following steps S11 to S13.

At step S11, a file attribute of a file to be displayed is extracted.

The file attribute may indicate, for example, a type of the file. As an example, the file attribute may indicate that the file is a text file or an image file.

At step S12, a pixel density of a display screen for displaying the file is automatically set according to the file attribute of the file to be displayed by searching the pixel density corresponding to the file attribute of the file from a pre-stored pixel density model.

For example, the pixel density of the display screen for displaying the text file may be set lower than the pixel density of the display screen for displaying the image file.

At this step, a corresponding relationship between the file attribute of the file and the pixel density of the display screen for displaying the file with the file attribute is recorded in the pre-stored pixel density model, for example, different file attributes correspond to different pixel densities respectively.

At step S13, the file is displayed according to the set pixel density.

In some implementations, at step S12, if the file attribute of the file to be displayed is new, the pixel density of the display screen for displaying the file is set to be a default value.

The file attribute of the file to be displayed being new indicates that the corresponding relationship between the file attribute of the file and the pixel density of the display screen for displaying the file is not recorded in the pre-stored pixel density model, and therefore, it is feasible to set the pixel density of the display screen for displaying to be the default value.

With the display method of the embodiment of the present disclosure, in a case that file attributes of files to be displayed are different from each other, the pixel density of the display screen for displaying the files may be variable. Therefore, the pixel density of the display screen meets requirements of users but does not need to be always high. Compared with a situation that the pixel density of the display screen is always high, a power consumption of the display screen may be reduced, and meanwhile, an electric powered run time of the display device adopting the display method can be improved.

In some implementations, the display method may further include step S14: optimizing the pre-stored pixel density model based on a display history.

For example, a display history over a specified period of time may be collected and analyzed periodically or according to a user's instruction, and then the pre-stored pixel density model may be optimized based on the display history.

By way of example, display histories may be classified according to types of files, for example, a type of display history is recorded as historical display times of a type of file, so that the pixel density corresponding to the type of file in the pre-stored pixel density model may be automatically adjusted according to the historical display times of the type of file, so as to optimize the pre-stored pixel density model.

For example, if the historical display times of the type of file is higher than a specified value, it indicates that the type of file is paid more attention, and therefore it is feasible to properly increase the pixel density corresponding to the type of file in the pre-stored pixel density model.

It should be noted that, above descriptions take an example that the file attribute indicates the type of the file. However, the file attribute may also indicate, for example, an image binarization array type, or the like. In a case that the file attribute indicates the image binarization array type, a corresponding relationship between the image binarization array type and the pixel density of the display screen for displaying an image having the image binarization array type is recorded in the pre-stored pixel density model. To optimize the pre-stored pixel density model, the display histories may be classified according to image binarization array types. For example, a type of display history is recorded as historical display times of an image binarization array type of image, and if the historical display times of the image binarization array type of image is higher than a specified value, it indicates that the image binarization array type of image is paid more attention, and therefore, it is feasible to properly increase the pixel density corresponding to the image binarization array type in the pre-stored pixel density model.

The display method provided by the embodiment of the present disclosure can dynamically adjust the corresponding relationship between the file attribute and the pixel density of the display screen for displaying the file with the file attribute on a basis of machine learning from the display history, i.e., optimize the pre-stored pixel density model, so that the pixel density of the display screen for displaying the file can be more reasonable and more humanized according to the file attribute of the file to be displayed. Compared with a situation that the pixel density of the display screen is always high, a power consumption of the display screen may be reduced, and meanwhile, an electric powered run time of the display device adopting the display method can be improved.

Figure 2:
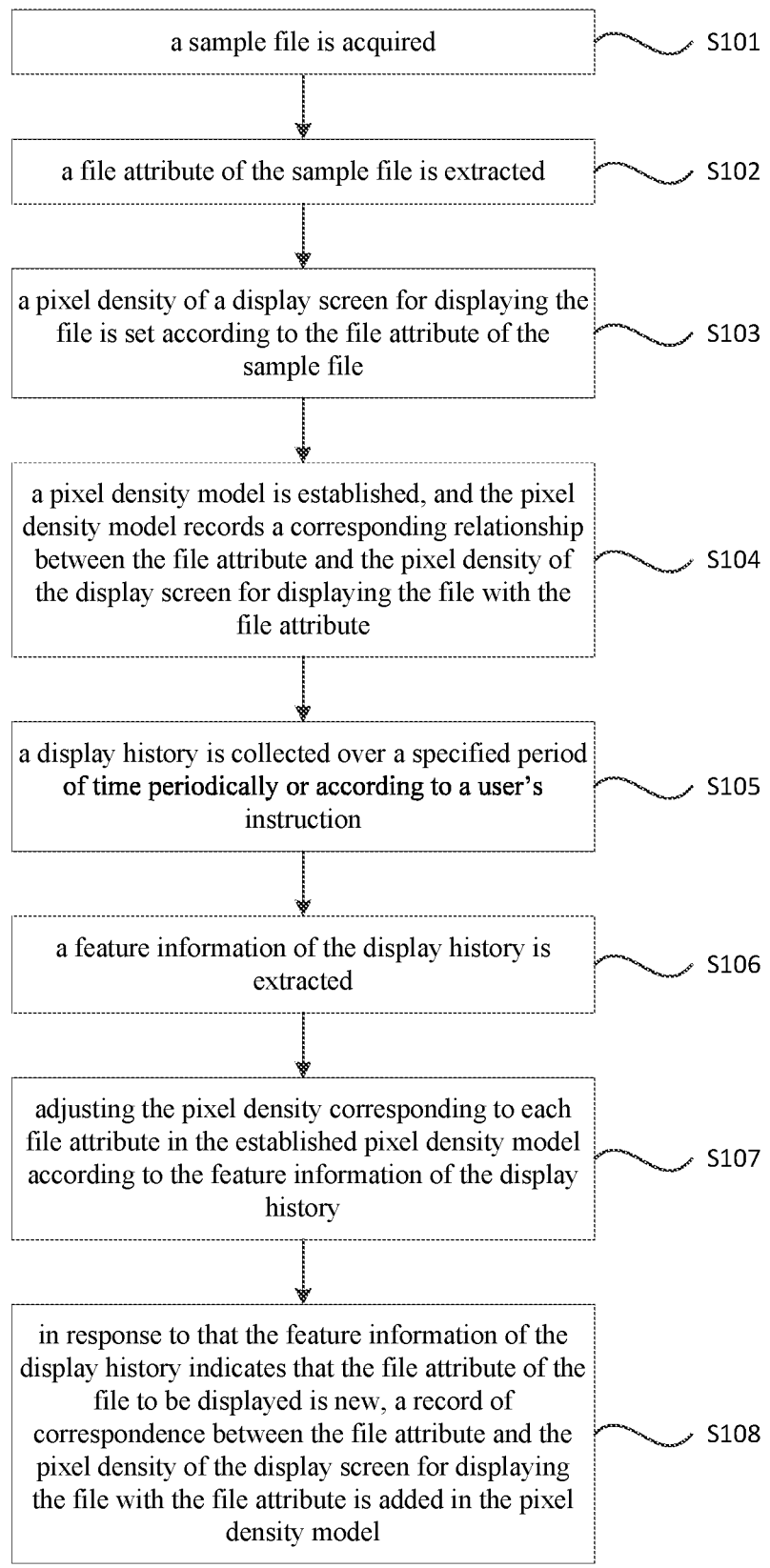
FIG. 2 is a flow chart of a method for establishing and optimizing a pixel density model of an embodiment of the present disclosure.

FIG. 2 shows a flow chart of a method for establishing and optimizing a pixel density model of an embodiment of the present disclosure. As shown in FIG. 2, the method for establishing and optimizing the pixel density model includes following steps S101 to S107.

Step S101, a sample file is acquired.

The sample file may be, for example, a set of files to be displayed.

Step S102, a file attribute of the sample file is extracted.

The file attribute may indicate, for example, a type of the file. As an example, the file attribute may indicate that the file is a text file or an image file.

Step S103, a pixel density of a display screen for displaying the file is set according to the file attribute of the sample file.

For example, in a case that file attributes of files are different from each other, the pixel density of the display screen for displaying the files may be variable.

As an example, when the file attribute indicates that the file is the text file, the pixel density of the display screen for displaying the file may be set to be small, and when the file attribute indicates that the file is the image file, the pixel density of the display screen for displaying the file may be set to be large.

Step S104, a pixel density model is established, and the pixel density model records a corresponding relationship between the file attribute and the pixel density of the display screen for displaying the file with the file attribute.

Step S105, a display history is collected over a specified period of time periodically or according to a user's instruction.

The display history may, for example, indicate a user's browsing habit, and thus collecting the display history over the specified period of time enables a personalized optimization on the established pixel density model.

Step S106, a feature information of the display history is extracted.

For example, the feature information may be the file attribute and display times corresponding thereto. If the display times corresponding to the file attribute exceed a specified value, it indicates that the file with the file attribute is paid more attention.

Step S107, adjusting the pixel density corresponding to each file attribute in the established pixel density model according to the feature information of the display history.

For example, the pixel density corresponding to a file attribute with historical display times larger than a first specified value (e.g., 20 times) is increased to be a first threshold value (e.g., 350), and the pixel density corresponding to a file attribute with historical display times smaller than a second specified value (e.g., 10 times) is decreased to be a second threshold value (e.g., 305), where the first specified value is greater than the second specified value, and the first threshold value is greater than the second threshold value.

In some implementations, the method for establishing and optimizing the pixel density model further includes step S108: in response to that the feature information of the display history indicates that the file attribute of the file to be displayed is new, adding a record of correspondence between the file attribute and the pixel density of the display screen for displaying the file with the file attribute in the pixel density model.

For example, in a case that the feature information of the display history is recorded as the file attribute and the display times corresponding thereto, the pixel density corresponding to the new file attribute may be adjusted according to the display times corresponding to the new file attribute.

It should be noted that, above descriptions take an example that the file attribute indicates the type of the file. However, the file attribute may also indicate, for example, an image binarization array type, or the like. In a case that the file attribute indicates the image binarization array type, a corresponding relationship between the image binarization array type and the pixel density of the display screen for displaying an image having the image binarization array type is recorded in the pixel density model. To optimize the pixel density model, the display history may be classified according to image binarization array types. For example, a type of display history is recorded as historical display times of an image binarization array type of image, and if the historical display times of the image binarization array type of image is higher than a specified value, it indicates that the image binarization array type of image is paid more attention, and therefore, it is feasible to properly increase the pixel density corresponding to the image binarization array type in the established pixel density model.

The method for establishing and optimizing the pixel density model provided by the embodiment can dynamically adjust the corresponding relationship between the file attribute of the file and the pixel density of the display screen for displaying the file with the file attribute through machine learning from the display history, i.e., optimize the pixel density model, so that the pixel density of the display screen for displaying the file with the file attribute can be more reasonable and more humanized according to the file attribute.

Figure 3:
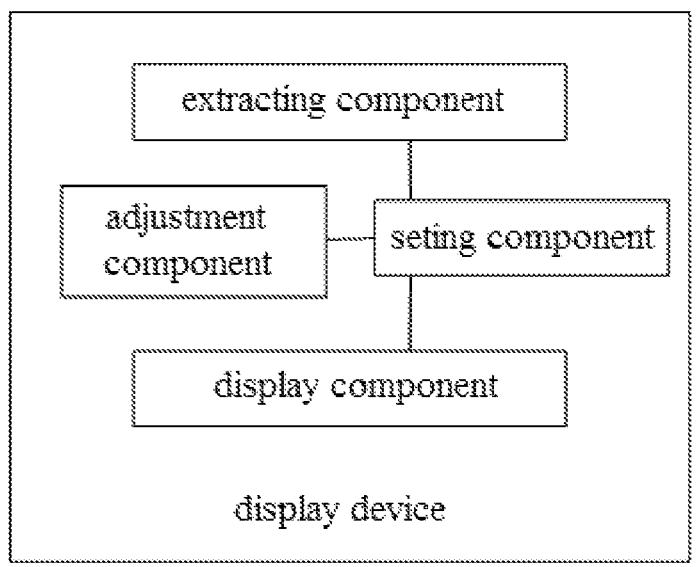
FIG. 3 is a schematic diagram of a display device according to an embodiment of the present disclosure.

FIG. 3 shows a schematic diagram of a display device according to an embodiment of the present disclosure. As shown in FIG. 3, the display device includes: an extraction component configured to extract a file attribute of a file to be displayed; a setting component configured to automatically set a pixel density of a display screen for displaying the file, according to the file attribute of the file to be displayed, by searching the pixel density corresponding to the file attribute of the file from a pre-stored pixel density model; and a display component configured to display the file according to the set pixel density.

In some implementations, the setting component is further configured to set the pixel density of the display screen for displaying the file to be a default value if the file attribute of the file to be displayed is new.

In some implementations, the display device may further include: an adjustment component configured to optimize the pre-stored pixel density model based on a display history.

For example, the adjustment component may be configured to increase the pixel density corresponding to a file attribute with historical display times larger than a first specified value (e.g., 20 times) to be a first threshold value (e.g., 350), and decrease the pixel density corresponding to a file attribute with historical display times smaller than a second specified value (e.g., 10 times) to be a second threshold value (e.g., 305), where the first specified value is greater than the second specified value, and the first threshold value is greater than the second threshold value.

In some implementations, the adjustment component is configured to add a record of correspondence between the file attribute of the file to be displayed and the pixel density of the display screen for displaying the file with the file attribute in the pre-stored pixel density model if the display history indicates that the file attribute is new.

For example, the pixel density corresponding to the new file attribute may also be adjusted according to the display times corresponding to the new file attribute.

The display device of the embodiment of the present disclosure can dynamically adjust the pixel density of the display screen for displaying the file, therefore, the pixel density of the display screen can meet requirements of users but does not need to be always high. Compared with the situation that the pixel density of the display screen is always high, the power consumption of the display screen may be reduced, and meanwhile, the electric powered run time of the display device can be improved.

An embodiment of the present disclosure further provides a terminal device, which includes the display device as described above.

An embodiment of the present disclosure further provides a terminal device, including a memory and a processor, where the memory stores a program that is executable on the processor, and the processor executes the program to implement following steps: extracting a file attribute of a file to be displayed; according to the file attribute of the file to be displayed, automatically setting a pixel density of a display screen for displaying the file by searching the pixel density corresponding to the file attribute of the file from a pre-stored pixel density model; and displaying the file according to the set pixel density.

An embodiment of the present disclosure further provides a computer-readable storage medium storing computer-executable instructions which, when executed by a processor, cause the processor to implement the display method of the embodiment of the present disclosure.

It should be understood by those skilled in the art that all or part of steps of the display method of the embodiment of the present disclosure may be implemented by hardware (e.g., a general-purpose computer, a processor, etc.) associated with program instructions, and the program instructions may be stored in a computer-readable storage medium (e.g., a read-only memory, a magnetic or optical disk, etc.). Further, each step of the display method of the embodiment of the present disclosure may be implemented by a single integrated circuit, or some steps of the display method of the embodiment of the present disclosure may be implemented by being integrated into a single integrated circuit. Accordingly, the components of the display device of the embodiment of the present disclosure may be implemented in form of software, hardware, or a combination thereof. The present disclosure is not intended to be limited to any particular form of implementation.

The described embodiments and implementations are merely examples, and it should be understood that various changes and modifications may be made by one of ordinary skill in the art without departing from the concept of the present disclosure, and such changes and modifications are to be considered within the scope of the present disclosure.

What is claimed is:

1. A display method, comprising:
    extracting a file attribute of a file to be displayed;
    automatically setting, according to the file attribute of the file to be displayed, a pixel density of a display screen for displaying the file by searching the pixel density corresponding to the file attribute of the file from a pre-stored pixel density model;
    displaying the file according to the set pixel density; and
    optimizing the pre-stored pixel density model according to a display history.

2. The method of claim 1, wherein in response to that the file attribute of the file to be displayed is new, the pixel density of the display screen for displaying the file is set to be a default value.

3. The method of claim 1, wherein the display history includes historical display times, and optimizing the pre-stored pixel density model according to the display history comprises:
    increasing the pixel density corresponding to a file attribute with historical display times larger than a first specified value to be a first threshold value, and reducing the pixel density corresponding to a file attribute with historical display times smaller than a second specified value to be a second threshold value, wherein the first specified value is greater than the second specified value, and the first threshold value is greater than the second threshold value.

4. The method of claim 1, wherein in response to that the display history indicates that the file attribute of the file to be displayed is new, a record of correspondence between the file attribute and the pixel density of the display screen for displaying the file with the file attribute is added to the pre-stored pixel density model.

5. The method of claim 1, wherein the display history is collected periodically or according to a user's instruction.

6. A computer-readable storage medium storing computer-executable instructions which, when executed by a processor, cause the processor to implement the method of claim 1.

7. A terminal device, comprising a memory and a processor, the memory storing a program executable on the processor, the processor executes the program to implement steps of:

extracting a file attribute of a file to be displayed;

automatically setting, according to the file attribute of the file to be displayed, a pixel density of a display screen for displaying the file by searching the pixel density corresponding to the file attribute of the file from a pre-stored pixel density model; and displaying the file according to the set pixel density; and optimizing the pre-stored pixel density model according to a display history.

8. The device of claim 7, wherein in response to that the file attribute of the file to be displayed is new, the pixel density of the display screen for displaying the file is set to be a default value.

9. The device of claim 7, wherein the display history includes historical display times, and optimizing the pre-stored pixel density model according to the display history comprises:

increasing the pixel density corresponding to a file attribute with historical display times larger than a first specified value to be a first threshold value, and reducing the pixel density corresponding to a file attribute with historical display times smaller than a second specified value to be a second threshold value, wherein the first specified value is greater than the second specified value, and the first threshold value is greater than the second threshold value.

10. The device of claim 7, wherein in response to that the display history indicates that the file attribute of the file to be displayed is new, a record of correspondence between the file attribute and the pixel density of the display screen for displaying the file with the file attribute is added to the pre-stored pixel density model.

11. The device of claim 7, wherein the display history is collected periodically or according to a user's instruction.

\* \* \* \* \*